INVENTOR
MARTIN V. POWERS
BY
ATTORNEY

March 25, 1969 M. V. POWERS 3,435,350

DIGITAL WAVEFORM TRANSITION SYNTHESIZER

Filed April 21, 1966 Sheet 2 of 4

INVENTOR
MARTIN V. POWERS

BY Stanley M. Schurgin

ATTORNEY

INVENTOR
MARTIN V. POWERS

BY Stanley M. Schurgin

ATTORNEY

INVENTOR
MARTIN V. POWERS
BY Stanley M. Schurgin
ATTORNEY

United States Patent Office 3,435,350
Patented Mar. 25, 1969

3,435,350
DIGITAL WAVEFORM TRANSITION SYNTHESIZER

Martin V. Powers, Williamsville, N.Y., assignor to Sylvania Electric Products Inc., a corporation of Delaware Filed Apr. 21, 1966, Ser. No. 544,307
Int. Cl. H03b 19/14
U.S. Cl. 328—14 11 Claims

ABSTRACT OF THE DISCLOSURE

A pulse shaping circuit comprising a periodic waveform generator and a set of analog switches controlled by a timing source for deriving components of the generated waveforms. A second set of switches is arranged to assemble the derived waveform components in response to control signals from a transition detector which correspond to waveform components recognized in a digital stream applied to the transition detector. The resulting assembled output waveform is a facsimile of the received digital stream except that components derived from the periodic waveform generator are substituted for corresponding waveform components of the received digital stream.

This invention relates generally to digital pulse shaping circuits, and more particularly to improved means for controlling the mark-space transition waveform in an externally generated digital stream, or for controlling the emission characteristics of a digitally modulated transmitter.

The digital stream operated upon by the present invention comprises a typical binary coded sequence of equal time interval voltage bits. A binary "1" or mark is represented by a first voltage level for the given bit period, and a binary "0" or space is represented by a second voltage level for the bit period. Generation of $n$ successive marks results in a constant first voltage level for $n$ successive bit periods, and $n$ successive space signals appear as a constant second voltage level for a period of $n$ bits. The resulting digital waveform, therefore, is a series of rectangular pulses with very abrupt, nearly zero time, mark-to-space level and space-to-mark level transitions; for convenience, both of these transitions shall hereinafter be referred to as mark-space.

Typically, digital streams of this type are employed for the transmission of intelligence in digital processing systems and closed circuit links, and as the modulating waveforms for digital radio transmitters. In applying a rectangular waveform to digitally modulate a transmitter carrier, however, a problem arises in confining the spectral energy of the transmission to a desired narrow bandwidth. As is well known, this problem is due to the abrupt nature of the mark-space transitions, which results in the generation of undesired spurious sidebands. Such undesired radiations increase the actual radio frequency bandwidth occupied by the transmission and can very likely interfere with other radio services.

One approach to overcoming this problem is to filter the output signal of the transmitter; this solution, however, is limited to relatively low power applications. Another approach is filtering the input digital stream, but this may not prove practical in applications where nonlinearities in the modulator could prevent the filtered input from truly reducing the output bandwidth. Also, if a threshold detection technique is used at the receiver, amplitude distortion caused by the filtering could significantly increase the error rate at the receiver.

A much more suitable and direct solution would be to attack the root of the problem by providing a digital waveform in which the mark-space transitions are not abrupt, but rather, change gradually, for example in the manner of a sinusoidal or ramp function. What is required, therefore, is a waveform transition synthesizer which will accept an externally generated digital message stream and pass it on, with the only alteration being that the mark-space transitions consist of the segment of a selected function which changes amplitude gradually with respect to time.

Accordingly, it is a principal object of this invention to provide improved means for controlling the mark-space transition waveform of an externally generated digital stream.

Another object of the invention is to provide a pulse shaping circuit which operates upon an externally generated binary sequence to produce an output waveform which is a facsimile of that binary sequence except that the mark-space transitions consist of the segment of a selected function whose amplitude changes gradually with respect to time.

Another object is to provide a transition synthesizer which generates a transition controlled digital waveform in response to an input digital stream and in which the preselected transition waveform can be changed relatively easily.

A further object of the invention is to provide means in a digitally modulated transmitter for converting the abrupt mark-space transitions in the digital signal stream to gradual transitions, prior to modulation of the carrier, thereby controlling the emission characteristics of the transmitter.

Briefly, the foregoing objects are attained by a digital waveform transition synthesizer comprising: a periodic waveform generator; a set of analog switches controlled by a timing source for deriving waveform components from the outputs of the periodic waveform generator; a transition detector adapted to receive the digital stream, recognize waveform components thereof and provide respective output signals; and, a second set of switches for assembling the derived periodic waveform components in response to the output signals from the transition detector. The resulting output waveform from the synthesizer is a facsimile of the received digital stream except that components derived from the periodic waveform generator are substituted for corresponding waveform components of the received digital stream.

In one preferred embodiment of the invention, sinusoidal transitions are substituted for the normally abrupt mark-space transitions of the digital stream. The periodic waveform generator provides a pair of sine waves of opposite polarity and one-half the frequency of the system clock, and which are selectively applied to a set of four analog switches. A bistable multivibrator triggered by the clock source controls the analog switches to provide the following four outputs to a second set of four analog switches during each clock period: a positive-going sinusoidal transition; a constant positive voltage level; a constant negative voltage level; and, a negative-going sinusoidal transition. The transition detector comprises a two-bit shift register driven by the clock source and having the digital data stream applied as a steering input. In this manner, the four states of the shift register correspond respectively to the following waveform components of the received digital stream; mark transition; mark hold; space transition; and, space hold. A diode logic matrix connected to the output terminals of the shift register recognizes these four states and provides corresponding signal outputs to control the second set of analog switches. The outputs of the second set of switches, which assemble the desired waveform, are connected together at a common synthesizer output terminal.

The device is quite flexible in that the synthesized transition waveform may be readily changed to meet different waveform characteristic requirements merely by altering the periodic waveform generator. The following discussion includes descriptions of alternate waveform generators for producing a quarter sine wave transition, and a ramp function transition.

Other objects, features and advantages of the invention, and a better understanding of its construction and operation, will be evident from the following description taken in connection with the accompanying drawings, in which.

Figure 1:
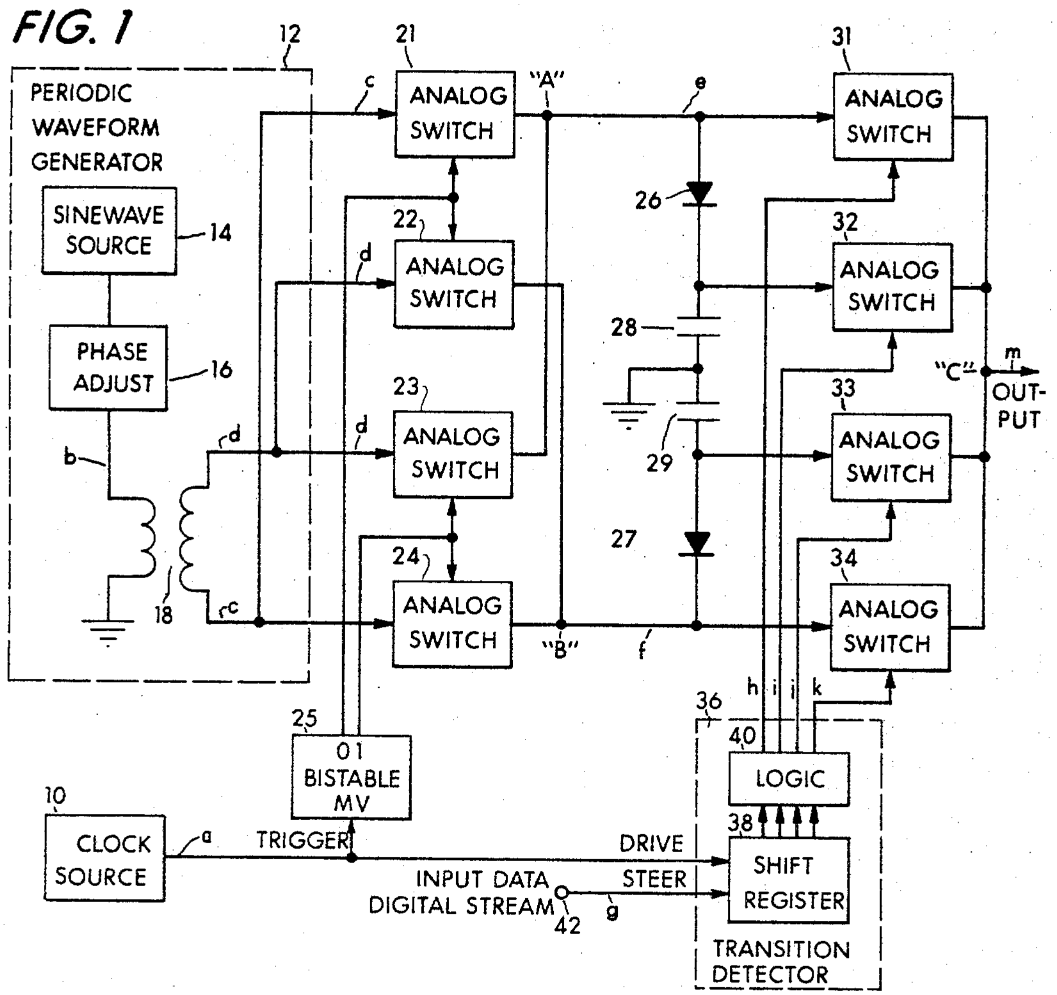
FIG. 1 is a block diagram of a preferred embodiment of a digital waveform transition synthesizer in accordance with the present invention.
Figure 2:
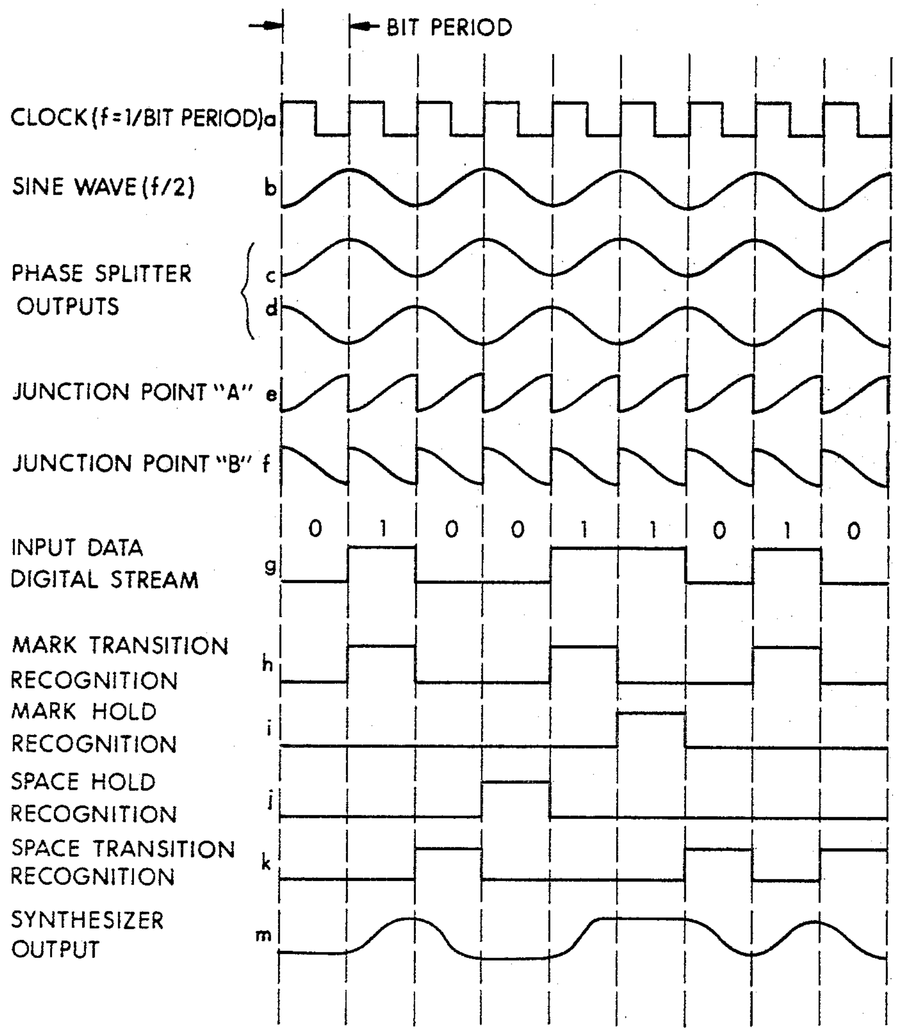
FIG. 2 shows a series of waveforms appearing at various points in the synthesizer of FIG. 1.

Referring to the block diagram of FIG. 1 and the waveforms of FIG. 2, a preferred embodiment of the invention is shown in which the synthesizer operates upon a received digital stream to provide sinusodial mark-space transistions. The reference timing rate for the synthesizer is provided by a clock source 10 which generates a square wave output, illustrated as waveform *a* in FIG. 2, at a frequency or bit rate *f*. The means from which the desired mark-space waveform transitions are derived comprises a periodic waveform generator 12, which includes a sine wave source 14 connected through a phase adjust circuit 16 and transformer type phase splitter 18 to provide a set of four output waveforms. More specifically, source 14 provides a sine wave of one-half the clock frequency, this sine wave being shifted in phase by the phase adjustment circuit 16 so that it has the proper phase relationship to the bit period of the clock source, as shown by waveform *b* in FIG. 2. Waveform *b* is applied to one terminal of the primary winding of phase splitter 18, the other terminal of the primary being connected to ground. The resulting output waveforms *c* and *d* at the two secondary winding terminals of the phase splitter are respectively phase shifted by 180°.

A set of four analog switches 21, 22, 23 and 24, controlled by the outputs from a clock triggered bistable multivibrator 25, together with a pair of peak detectors comprising diodes 26 and 27 and capacitors 28 and 29, derive desired waveform components from the outputs of the periodic waveform generator 12. The waveform *c* output terminal of phase splitter 18 is connected in parallel to the input terminals of analog switches 21 and 24, and the other output terminal of the phase splitter is connected to apply waveform *d* in parallel to the inputs of analog switches 22 and 23. The alternate first and second states of bistable multivibrator 25 are triggered by successive clock pulses, the "1" output of the bistable multivibrator being connected to the control terminals of analog switches 23 and 24, while the "0" output of the bistable multivibrator is connected to analog switches 21 and 22. Consequently, the analog switches 21–24 are controlled in a binary manner in response to alternate first and second clock periods so that switches 21 and 22 are rendered conducting during every other bit period, i.e., each of the first clock periods, and switches 23 and 24 are turned on during the alternate periods, i.e., each of the second clock periods. The result is that during each first clock period, switch 21 conducts a positive-going sinusoidal transition and switch 22 conducts a negative-going sinusoidal transition, and during each second clock period, switch 23 conducts a positive-going transition of the sine wave and switch 24 conducts a negative-going transition of the sine wave.

The outputs of switches 21 and 23 are tied together at a junction point A to provide output waveform *e*, a sequence of positive going sinusoidal transitions at the clock bit rate, and switches 22 and 24 are connected together at a junction point B to provide an output waveform *f*, a sequence of negative going sinusoidal transitions at the clock bit rate. Diode 26 and capacitor 28 are serially connected between junction point A and ground, with the anode of diode 26 connected to junction point A, and diode 27 and capacitor 29 are serially connected between junction point B and ground, with the cathode of diode 27 being connected to junction point B. In operation, capacitor 28 charges through diode 26 to the positive peak value of waveform *e*, and capacitor 29 charges through diode 27 to the negative peak value of waveform *f*. The voltages on capacitors 28 and 29 represent the mark and space levels, respectively. During each clock bit period, therefore, there are four waveform components available from the circuit combination of gates 21–24 and their output peak detectors, namely, signals representing mark transitions, continuous mark, continuous space, and space transitions. Hence, the four possible conditions of a binary sequence waveform are generated.

A second set of analog switches 31, 32, 33 and 34 is connected to assemble the waveform components derived from the generated periodic waveforms as controlled by a transition detector 36 responsive to an input data stream applied thereto. Junction point A is connected to the input terminal of analog switch 31 so that waveform *e* is applied to that switch. The input terminal of analog switch 32 is connected to the junction of diode 26 and capacitor 28, and the input of switch 33 is connected to the junction of diode 27 and capacitor 29. Finally, the input of switch 34 is connected to junction point B so that waveform *f* is applied to the input of that switch. The output terminals of switches 31–34 are connected together at a common junction point C, from which the synthesizer output waveform is available. Consequently, conducting switch 31 gates through a positive-going sinusoidal transition to the synthesizer output; conducting switch 32 provides a constant positive voltage level; conducting switch 33 provides a constant negative voltage level; and conducting switch 34 provides a negative-going sinusoidal transition to the synthesizer output.

Transition detector 36 includes a shift register 38 having a recognition logic circuit 40 connected at its output terminals, the outputs of the logic circuit being respectively connected to the control terminals of analog switches 31–34. Shift register 38 may comprise two bistable multivibrator stages, with clock waveform *a* being applied as the drive input, and the input data (binary word) digital stream being applied via input terminal 42 to steer the shift register. The four outputs of the shift register, i.e., the "1" and "0" outputs of each bistable multivibrator, are connected to logic circuit 40, which may comprise a matrix of diode AND gates arranged in a well known manner to recognize the 10, 11, 01 and 00 states of the shift register. Hence, as a binary word comprising a sequence of 1's and 0's is shifted into the register, the content of the shift register will be varied accordingly.

The operation of transition detector 36 will be more clearly understood by referring to the waveforms of FIG. 2. Waveform *g* represents the input data digital stream applied at terminal 42 to steer the shift register. As indicated by the notation in each bit period above the waveform, this sample digital stream represents the binary sequence 010011010. In this particular example, the register is shifted to the 10 state in response to a mark transition (positive-going transition) in the input data stream. The logic circuit recognizes this 10 condition and provides a unique output signal *h* which, being representative of a mark transition recognition, is applied to the control terminal of analog switch 31. The register is shifted to an 11 state in response to a relatively positive hold level in the digital stream; this results in a mark hold recognition signal *i* from the logic circuit, waveform *i* being applied to the control terminal of analog switch 32. A negative-going transition in the digital stream shifts the register to a 01 state, and a space transition recognition signal *k* results, signal *k* being applied to the control terminal of analog switch 34. Finally, the register is shifted to the 00 state in response to a relatively negative hold level in the digital stream, and the resulting space hold recognition signal *j* is applied to control analog switch 33. As a result of this selective gating of the periodic waveform components in response to the input binary sequence, waveform *m* is assembled at the synthesizer output terminal (junction point C). It will be noted that waveform *m* is the same as the input digital stream waveform *g* (it carries the same binary information) except that sinusoidal transitions have been substituted for the abrupt mark-space transitions of the original externally generated waveform.

Figure 3:
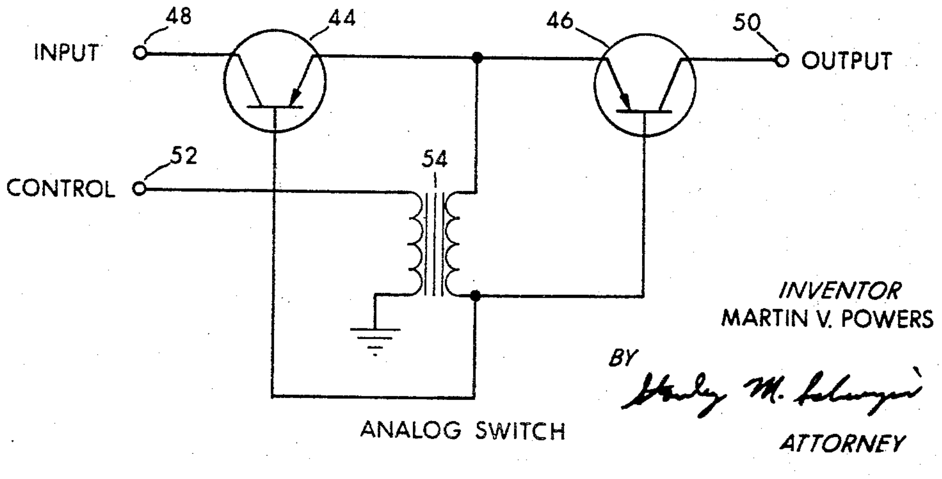
FIG. 3 is a schematic diagram of an analog switch useful in the synthesizer of FIG. 1.

Each of the analog switches 21–24 and 31–34 in FIG. 1 may comprise a transistorized analog switch of the type shown in FIG. 3. This circuit comprises a pair of PNP transistors 44 and 46 connected in similar manner to a conventional chopper circuit. The emitter electrodes of the transistors are connected together, as are the base electrodes, and the input signal is applied to the collector of transistor 44 at terminal 48, while the output is taken from the collector of transistor 46 at terminal 50. The control signal is applied via terminal 52 and coupling transformer 54 across the emitter base electrodes of both transistors. Terminal 52 is connected to one end of the primary winding of transformer 54, the other end being connected to ground, and the secondary winding of the transformer is connected across the base and emitter electrodes of the transistors. Application of a positive pulse or positive signal level at terminal 52 causes the emitter-base diodes of both transistors to be forward biased, thereby rendering transistors 44 and 46 fully conducting. As a result, the input signal at terminal 48 is passed on without alteration to output terminal 50 for the duration of the positive pulse or positive voltage level applied at control terminal 52, provided the duration of the positive level does not exceed the time constant of the transformer circuit. This time constant, of course, is determined by the inductance of the transformer 54 secondary winding, the reflected inductance of the primary winding, and the resistance of the forward biased emitter-base junctions of the transistors. For an input data rate of 5 kHz., a typical analog switch of the type shown in FIG. 3 can be rendered conducting for 1.4 to 1.8 milliseconds, or 7 to 9 bit periods, before the positive voltage aplied to transformer 54 decays below the threshold level necessary to maintain conduction. Such performance has been found satisfactory for a number of applications wherein the data system has code restraints upon the number of consecutive marks or spaces that may occur. A particular advantage of this analog switch circuit configuration is that the $V_{BE}$ characteristics of the transistors tend to cancel, thereby avoiding the undesirable "pedestal effect" usually associated with such semiconductor switches. It is to be understood however, that FIG. 3 is merely representative of a typical circuit, and that other analog switch circuits capable of much longer conduction periods are available if required.

The operation of the synthesizer shown in FIG. 1, as illustrated by the waveforms of FIG. 2, makes it quite useful for application in digital data communications systems having a limited bandwidth allocation. By using the synthesizer to modify the digital modulating stream, a waveform can be provided in which no frequency components higher than one-half of the clock bit rate are present. Essentially this device can be considered a type of active low pass filter. If compared to a passive filter its advantages are controlled phase shift of the output signal and a theoretically infinite rejection of frequency components above one-half the clock rate, with constant phase shift throughout the pass band.

When using the synthesizer in conjunction with a transmitter, modulator nonlinearities may be compensated for by changing the transition waveform. The transition synthesizer of FIG. 1 provides considerable flexibility in this respect, since the transition waveforms may be altered merely by substituting a different periodic waveform generator for circuit block 12. Two such alternate periodic waveform generator configurations, suitable for use in lieu of generator 12 in FIG. 1, are shown in FIGS. 4 and 6, with the related waveforms being illustrated in FIGS. 5 and 7, respectively.

Figure 4:
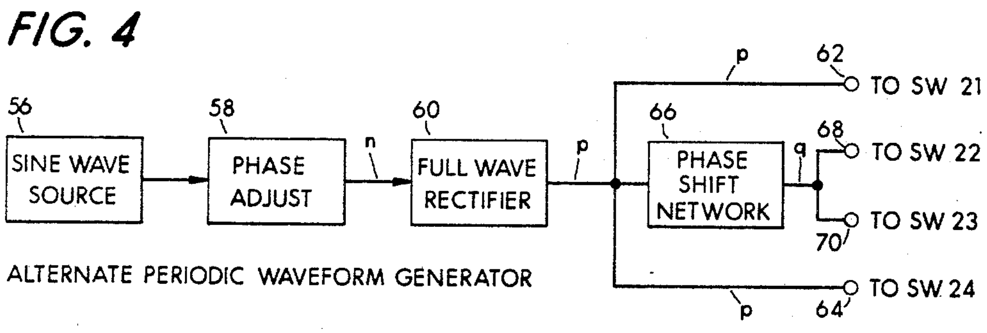
FIG. 4 is a block diagram of an embodiment of a periodic waveform generator useful in the synthesizer of FIG. 1.
Figure 5:
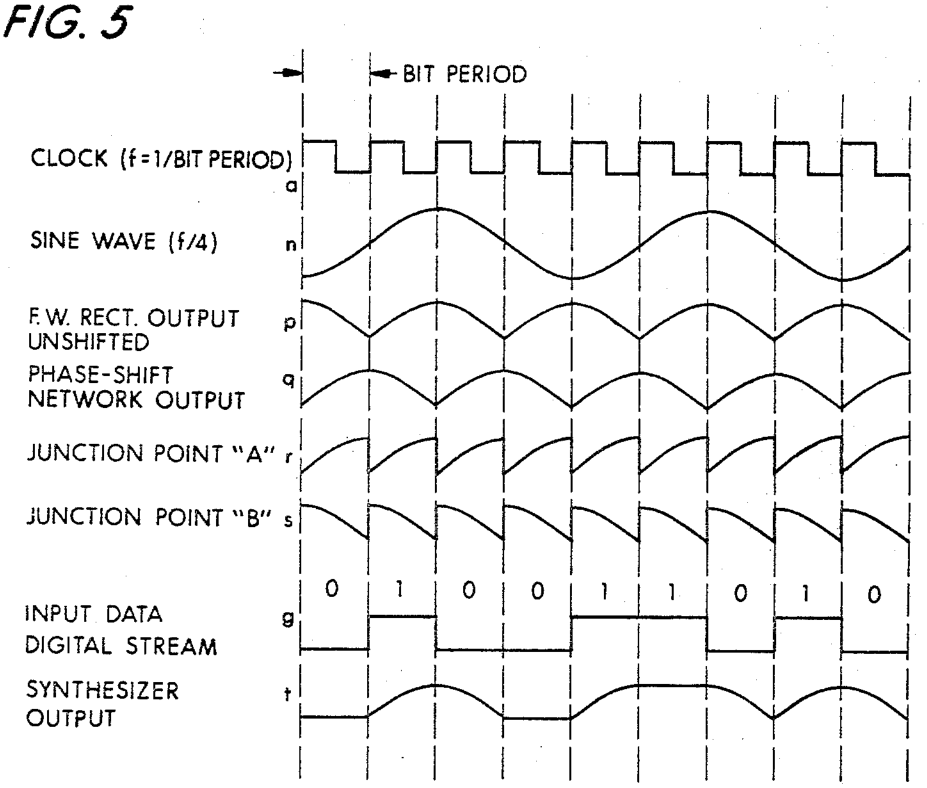
FIG. 5 shows a series of waveforms appearing at various points in the synthesizer of FIG. 1 when modified to include the waveform generator of FIG. 4.

The block diagram of FIG. 4 shows a periodic waveform generator which provides synthesizer output waveform transitions which are quarter sine waves. This circuit comprises a sine wave source 56 for generating a waveform at one-quarter the clock frequency, a phase adjust network 58 and a full wave rectifier 60. The phase adjust circuit 58 is employed to shift the $f/4$ sine wave so that it has the proper phase relationship with the clock waveform as illustrated by waveform *n* in FIG. 5. Application of waveform *n* to the full wave rectifier results in output waveform *p* from circuit 60. The output of the full wave rectifier is connected in parallel directly to output terminals 62 and 64 of the periodic waveform generator and through a phase shift network 66 to output terminals 68 and 70 of the waveform generator. Phase shift network 66 is operative to shift the phase of waveform *p* by 180° to provide waveform *q* as an output (this is a phase shift of 90° with respect to the original sine wive *n*). Output terminals 62, 68, 70 and 64 are then respectively connected to the inputs of switches 21, 22, 23 and 24 in lieu of the output connections from periodic waveform generator 12. With this arrangement, waveform *p* is applied to switches 21 and 24, and waveform *q* is applied to switches 22 and 23. The alternate conducting cycles of switches 21 and 22 with respect to switches 23 and 24 result in a waveform at junction point A which comprises a sequence of positive going quarter sine wave transitions occurring at the clock bit rate, as illustrated in waveform *r* of FIG. 5. A sequence of negative going quarter sine wave transitions at the clock bit rate occur at junction point B, as illustrated by waveform *s*. The waveform assembling switches 31–34 and the transition detector operate as previously described to provide a synthesizer output *t* in response to the input digital stream *g*. It will be noted that waveform *t* is the same binary waveform as *g* except that the quarter sine wave transitions have been substituted for the abrupt mark-space transitions. Waveform *t*, when fed to a square law modulator, produces the desired sine wave transitions in the output envelope of the transmitter.

Figure 6:
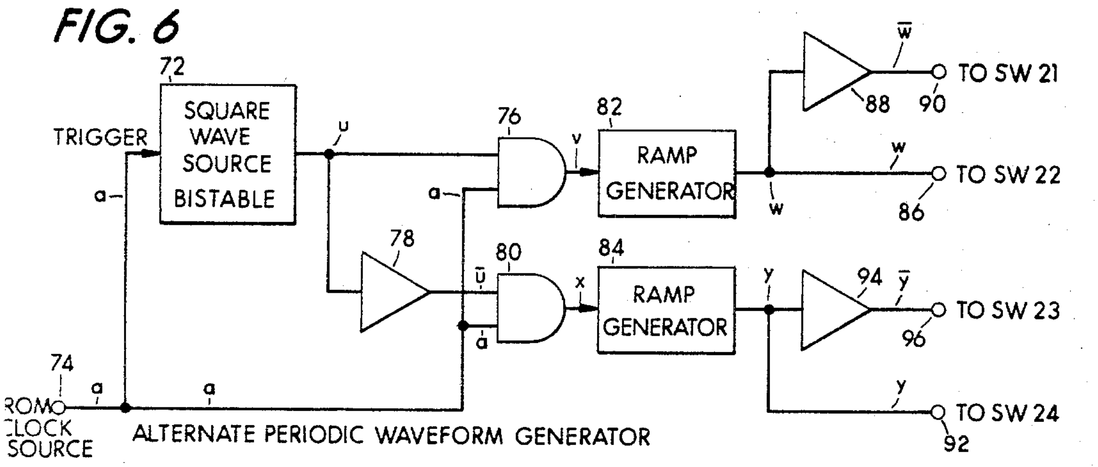
FIG. 6 is a block diagram of an alternate embodiment of a periodic waveform generator useful in the synthesizer of FIG. 1.

If ramp function waveform transitions are desired, the periodic waveform generator illustrated by the block diagram of FIG. 6 may be employed. In this instance, a square wave source of one-half the clock bit rate is employed instead of a sine wave source. In order to phase reference the square wave source to the clock bit rate, the square wave source may include a bistable multivibrator triggered by the pulses from the clock source as applied via input terminal 74 of this periodic waveform generator. The resulting output of square wave source 72 is illustrated by waveform *u* of FIG. 7, as referenced to the clock bit rate. The output of the square wave source is connected to one input of an AND gate 76 and through an inverter circuit 78 to one input of an AND gate 80. Clock source 10 is connected via input terminal 74 to the other input terminals of AND gates 76 and 80. The outputs of AND gates 76 and 80 are respectively coupled to a pair of ramp generators 82 and 84, the output of ramp generator 82 being connected directly to waveform generator output terminal 86 and through an inverter 88 to output terminal 90, and the output of ramp generator 84 being connected directly to output terminal 92 of the periodic waveform generator and through inverter 94 to output terminal 96. Output terminals 90, 86, 96, and 92 are respectively connected to the input terminals of analog switches 21–24 in lieu of the outputs of periodic waveform generator 12.

In operation, the application of waveforms *u* and *a* to AND gate 76 results in an output square waveform *v* (FIG. 7) which is applied to ramp generator 82. In this instance, due to the supply voltage selected, the resulting output ramp functions generated by circuit 82 have a negative slope as illustrated by waveform *w* of FIG. 7. It will be noted from the vertical dashed lines referring the clock bit periods to the ramp waveform *w*, that only the linear portion of the ramp waveform is used by virtue of the switching functions gated by the synthesizer clock rate. Waveform *w* is applied directly to analog switch 22 and, after being inverted by circuit 88, is applied as the positive going ramp waveform $\overline{w}$ to switch 21.

Figure 7:
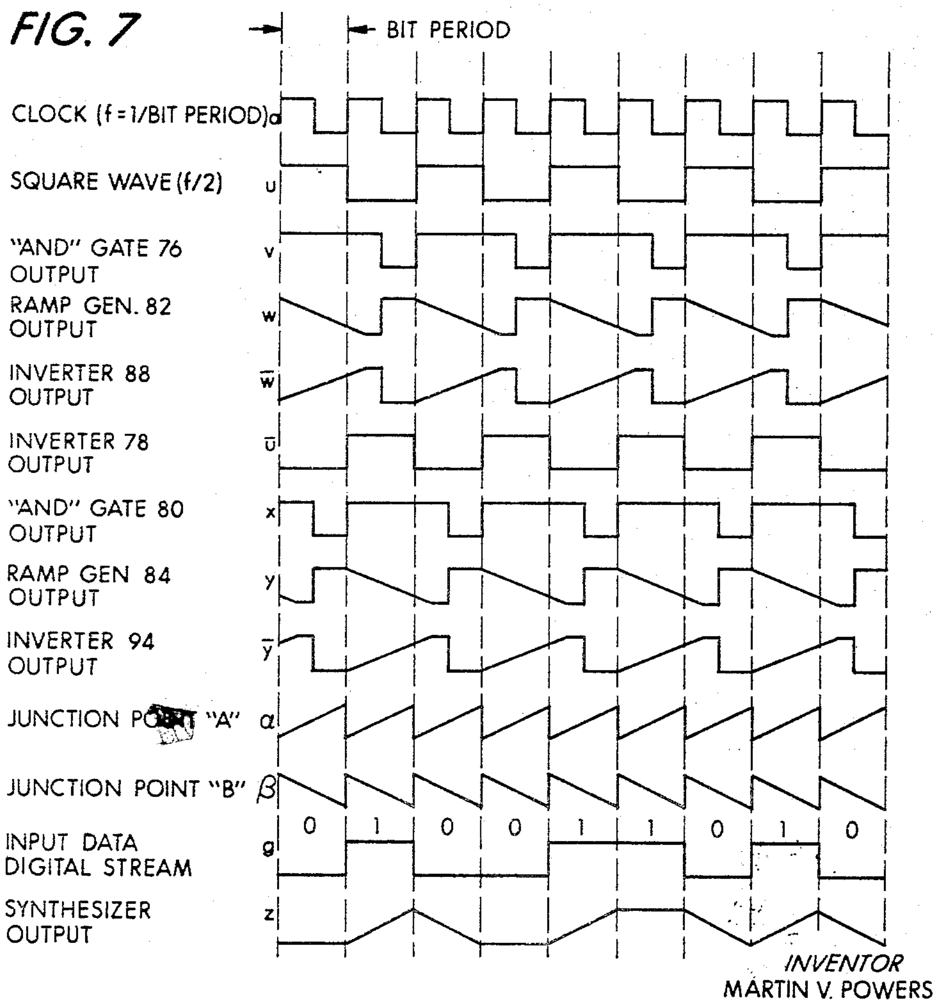
FIG. 7 shows a series of waveforms appearing at various points in the synthesizer of FIG. 1 when modified to include the waveform generator of FIG. 6.

Application of waveform *u* through inverter circuit 78 essentially shifts the phase of the square wave by 180°, as illustrated by waveform $\overline{u}$ of FIG. 7. Application of waveform $\overline{u}$ and clock waveform *a* to AND gate 80 results in an output waveform *x* being applied as the input to ramp generator 84. The resulting negative-going ramp waveform *y* generated by circuit 84 is applied directly to analog switch 24 and to inverter 94. The output of inverter 94, illustrated by waveform $\overline{y}$, is applied to analog switch 23.

The other portions of the synthesizer operate as previously described except that outputs from bistable source 72 may be used to control switches 21–24 in lieu of bistable multivibrator 25, and the switches will process ramp waveforms instead of sinuosidal functions. As a result, a saw tooth waveform at the clock bit rate and having a positive-sloping ramp will be provided at junction point A, as illustrated by waveform $\alpha$, and an inverted saw tooth waveform at the clock bit rate and having a negative-sloping ramp will be provided at junction point B, as illustrated by waveform $\beta$ in FIG. 7. The resulting synthesizer output waveform assembled by switches 31–34 in response to the input digital stream is that illustrated by waveform *z* in FIG. 7. In this instance, it will be noted that the abrupt mark-space transitions of digital stream *g* are replaced by ramp function transitions.

While particular embodiments of the invention have been illustrated, it is to be understood that the invention is not to be limited thereto since modifications will suggest themselves to ones skilled in the art. Rather, the true spirit and scope of the invention are to be defined only by the appended claims.

What is claimed is:

1. A digital waveform transition synthesizer for operating on an externally generated digital stream comprising, in combination: a clock source; means for generating periodic waveforms phase referenced to said clock source; means controlled by said clock source for deriving waveform components from said periodic waveforms; detection means time referenced to said clock source and adapted to receive said digital stream, recognize waveform components of said digital stream and provide respective output signals; and, means for assembling the components derived from said periodic waveforms in response to the output signals from said detection means, thereby providing an output waveform from said synthesizer which is a facsimile of said received digital stream except that components derived from said periodic waveform are substituted for corresponding waveform components of said received digital stream.

2. A transition synthesizer in accordance with claim 1 wherein said means for deriving waveform components from said periodic waveforms comprises a first set of switches each having input, output and control terminals, said periodic waveforms being applied to the input terminals of said first set of switches, means coupling the output terminals of said first set of switches to said waveform component assembling means, and means timed by said clock source and connected to the control terminals of said first set of switches for periodically rendering each of said switches conducting.

3. A transition synthesizer in accordance with claim 2 wherein said waveform component assembling means comprises a second set of switches each having input, output and control terminals, each of the input terminals of said second set of switches being coupled to selected ones of the output terminals of said first set of switches, the output signals of said detection means being applied to respective control terminals of said first set of switches, and means connecting the output terminals of said second set of switches to a common synthesizer output terminal

4. A transition synthesizer in accordance with claim 3 wherein said detection means comprises a shift register having a drive input terminal, a steering signal input terminal and a plurality of output terminals, said clock source being connected to the drive input of said register, said digital stream being applied to the steering signal input of said register, and a logic circuit connected to the output terminals of said register for recognizing the states of said shift register and providing output signals indicative of the states recognized, the output signals of said logic circuit being applied to the control terminals of respective ones of said second set of switches.

5. A transition synthesizer in accordance with claim 1 wherein the operational phases of said means for deriving waveform components from said periodic waveforms are switched in a binary manner in response to alternate first and second clock periods, and said means for generating periodic waveforms has first, second, third and fourth output terminals and is operative to provide a waveform at said first output terminal which includes a desired positive-going transition during each of said first clock periods, a waveform at said second output terminal which includes a desired negative-going transition during each of said first clock periods, a waveform at said third output terminal which includes said desired positive-going transition during each of said second clock periods, and a waveform at said fourth output terminal which includes said desired negative-going transition during each of said second clock periods

6. A transition synthesizer in accordance with claim 5 wherein said means for deriving waveform components from said periodic waveforms comprises, first, second, third and fourth analog switches each having input, output and control terminals, the first, second, third and fourth output terminals of said periodic waveform generating means being respectively connected to the input terminals of said first, second, third and fourth switches, the output terminals of said first and third switches being connected together at a first junction point and the output terminals of said second and fourth switches being connected together at a second junction point, a source of reference potential, a first diode and first capacitor serially connected in that order between said first junction point and said source of reference potential, a second capacitor and second diode serially connected in that order between said source of reference potential and said second junction point, and means timed by said clock source and connected to the control terminals of said first, second, third and fourth switches for rendering said first and second switches conducting during each of said first clock periods and rendering said third and fourth switches conducting during each of said second clock periods.

7. A transition synthesizer in accordance with claim 6 wherein said waveform component assembling means comprises fifth, sixth, seventh and eighth analog switches each having input, output and control terminals, the input terminal of said fifth switch being connected to said first junction point of the first and third switch output terminals, the input terminal of said sixth switch being connected to the junction of said first diode and first capacitor, the input terminal of said seventh switch being connected to the junction of said second capacitor and second diode and the input terminal of said eighth switch being connected to said second junction point of the second and fourth switch output terminals, the output signals of said detection means being respectively applied to the control terminals of said fifth, sixth, seventh and eighth switches, and means connecting the output terminals of said fifth, sixth, seventh and eighth switches together at a third junction point, from which the synthesizer output waveform is available.

8. A transition synthesizer in accordance with claim 7 wherein said detection means comprises a two-stage shift register having a drive input terminal, a steering input terminal and a plurality of output terminals, said clock source being connected to the drive input of said register, said digital stream being applied to the steering signal input of said register, and a logic circuit connected to the output terminals of said register for recognizing the four states of said register, said logic circuit being operative to provide first, second, third and fourth output signals corresponding respectively to first, second, third, and fourth states of said register, said register being shifted to said first state in response to a positive-going transition in said digital stream input and the resulting first logic output signal being applied to the control terminal of said fifth switch, said register being shifted to said second state in response to a relatively positive hold level in said digital stream input and the resulting second logic output signal being applied to the control terminal of said sixth switch, said register being shifted to said third state in response to a negative-going transition in said digital stream input and the resulting third logic output signal being applied to the control terminal of said seventh switch, and said register being shifted to said fourth state in response to a relatively negative hold level in said digital stream input and the resulting fourth logic output signal being applied to the control terminal of said eighth switch.

9. A transition synthesizer in accordance with claim 8 wherein said means for generating periodic waveforms comprises a sine wave source of one-half the frequency of said clock source, means for adjusting the phase of said sine wave with reference to said clock source, a phase splitter circuit having an input to which said phase adjusted sine wave is applied and first and second output terminals, said phase splitter providing sine waves at its first and second output terminals which are respectively phase shifted by 180° and of the same frequency as said sine wave source, means connecting the first output terminal of said phase splitter in parallel to the first and fourth output terminals of said periodic waveform generating means, and means connecting the second output terminal of said phase splitter in parallel to the second and third output terminals of said periodic waveform generating means.

10. A transition synthesizer in accordance with claim 8 wherein said means for generating periodic waveforms comprises a sine wave source of one-quarter the frequency of said clock source, means for adjusting the phase of said sine wave with reference to said clock source, a full wave rectifier having an input to which said phase adjusted sine wave is applied and an output terminal, means connecting the output terminal of said full wave rectifier in parallel to the first and fourth output terminals of said periodic waveform generating means, a phase shift network having an input connected to the output terminal of said full wave rectifier and an output terminal, and means connecting the output terminal of said phase shift network in parallel to the second and third output terminals of said periodic waveform generating means.

11. A transition synthesizer in accordance with claim 8 wherein said clock source provides a square wave output, and said means for generating periodic waveforms comprises a square wave source of one-half the bit rate of said clock source and phase referenced thereto, first and second AND gates, means for applying the output of said clock source to one input of each of said AND gates, means for applying the output of said square wave source to the other input of said first AND gate, means for inverting the output from said square wave source and applying said inverted square wave to the other input of said second AND gate, first and second ramp generators, the outputs of said first and second AND gates being respectively coupled to the inputs of said first and second ramp generators, means for splitting the output of said first ramp generator to provide first and second respectively inverted ramp waveform outputs, means for respectively coupling said first and second ramp outputs to the first and second output terminals of said periodic waveform generating means, means for splitting the output of said second ramp generator to provide third and fourth respectively inverted ramp waveform outputs, and means for coupling said third and fourth ramp outputs to the third and fourth output terminals of said periodic waveform generating means.

References Cited

UNITED STATES PATENTS 3,051,906 8/1962 Haynes ------------- 328—14
3,255,363 6/1966 Stella ----------- 328—181 XR ARTHUR GAUSS, *Primary Examiner.*

JOHN ZAZWORSKY, *Assistant Examiner.*

U.S. Cl. X.R.

307—228, 261, 263, 268; 328—181